June 25, 1940.    H. H. PAYZANT    2,205,600
MANUFACTURE OF LAMINATED STRUCTURES AND MATERIALS THEREFOR
Filed Oct. 31, 1935    2 Sheets-Sheet 1

Inventor
Henry H. Payzant
by W. Bartlett Jones,
Attorney.

June 25, 1940.  H. H. PAYZANT  2,205,600
MANUFACTURE OF LAMINATED STRUCTURES AND MATERIALS THEREFOR
Filed Oct. 31, 1935  2 Sheets-Sheet 2
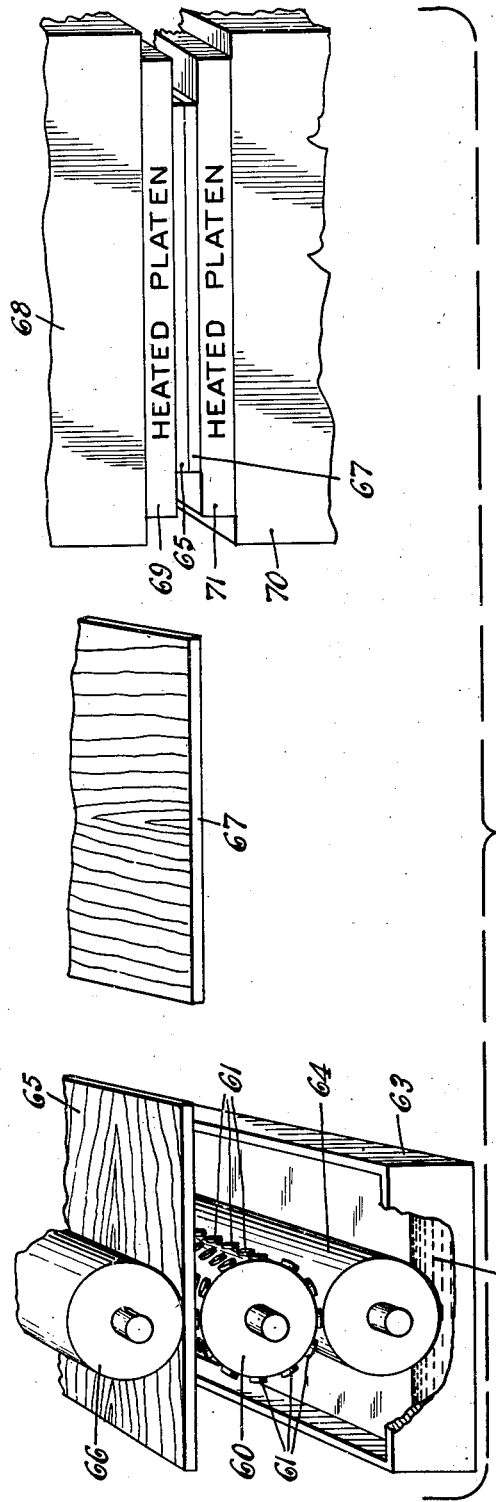
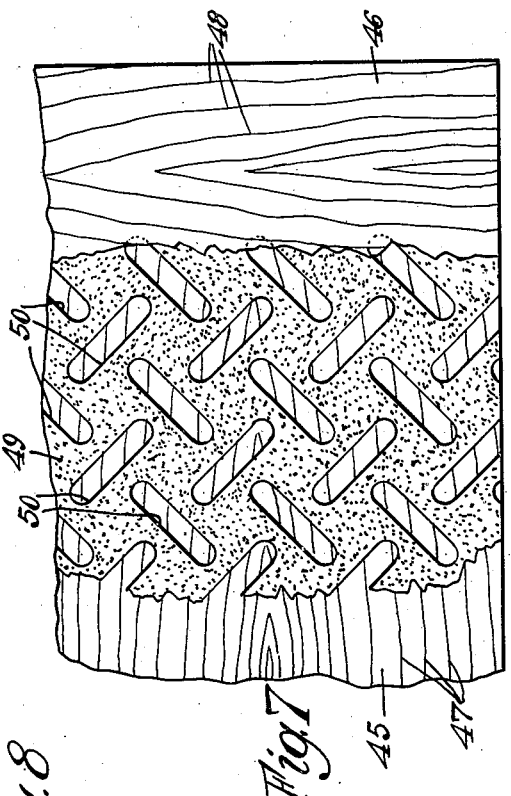
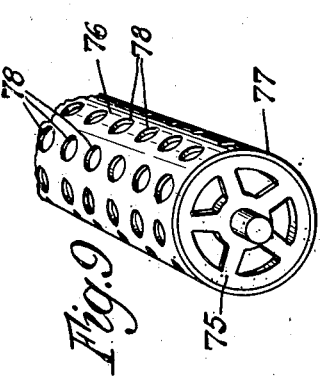
Inventor
Henry H. Payzant
by W. Bartlett Jones,
Attorney.

Patented June 25, 1940

2,205,600

UNITED STATES PATENT OFFICE 2,205,600

MANUFACTURE OF LAMINATED STRUCTURES AND MATERIALS THEREFOR

Henry H. Payzant, St. Paul, Minn., assignor to General Timber Service, Inc., St. Paul, Minn., a corporation of Delaware Application October 31, 1935, Serial No. 47,606

10 Claims. (Cl. 154—2)

The present invention relates to construction materials, and in particular to laminated or ply-structures in which sheets, layers or other bodies are adhesively united interfacially. The invention has reference to use of material for one or more of the united bodies which material is characterized by an equilibrium moisture content with its surroundings, and which changes in moisture content with changes in temperature of the body or its surroundings and changes in the humidity of the surroundings. It also has reference to the use of adhesive for uniting adjacent bodies, in such a particular way that the interfacial layer of adhesive does not obstruct the passage of moisture across the interface.

The invention may be embodied in numerous structures and with various materials, as will appear hereinafter. However, in order to illustrate the defects which are corrected by the present invention and to illustrate the nature of the invention, discussion will at first be limited to a field wherein its advantages are outstanding.

In the manufacture of ply-wood, two or more plies of wood veneer are adhesively united by an intervening layer of adhesive. It is an old practive in making ply-wood to have the grains of the veneers run at right angles in adjacent layers, thus to form more solid and rigid bodies from thinner sheets of flexible or pliable bodies. The alternation of the grains also aids in minimizing warping of the ply-wood. The warping of such ply-wood is one of the defects which it has been difficult to prevent. It is caused to a considerable extent by the unequal shrinkage or expansion of the plies as the moisture content in them varies. A contributing factor to inequality of moisture content is the use of ply-wood to separate surroundings differing in temperature and/or humidity. Another contributing factor is the presence of the interfacial layer of adhesive which serves as a partition or barrier to a flow of moisture across the interface whereby equilibrium moisture content might be more nearly attained. The defect is particularly noticeable in ply-structures having more than two plies, because then there is one ply which is between two such partitions of adhesive. It is also distinctly noticeable in two-ply structures where one face is decorated as with paint, varnish, or lacquer for a wall surface. The decorated ply is sealed in whole or in part between the adhesive layer and the decorative coat.

The more recent developments in ply-wood manufacture relate to the use of waterproof adhesives, a particular one being phenol-formaldehyde resin. Use of such adhesives permits exposure of ply-wood to out-of-doors conditions, either at one or both faces at the same time. Such exposure enhances the tendency to warp as above described. In making ply-wood, adhesive, such as phenol-formaldehyde resin, is provided in sheet form, preferably a sheet consisting of a delicate porous skeleton-like paper or fiber sheet impregnated and/or coated with an adhesive composition. One form is a synthetic resin which is normally solid and dry, which is incompletely reacted, but which can be activated to adhesiveness and simultaneously hardened, or finally reacted, by heat and pressure applied by platens which squeeze the sheet between plies. Ply-wood so made loses considerable of its normal moisture content, but when having only two plies, it can soon come to equilibrium moisture content after leaving the press. However, where there are two or more layers of resin adhesive in the structure, the intervening ply has little or no opportunity to come to a normal condition, except by an extremely slow process through any exposed edges. Such triplex or higher-ply structures are very undependable as regards warping, and are not at all adapted for successful use under conditions for which the waterproof adhesive is intended to adapt them.

The present invention is therefore aimed to overcome the defects above described and to produce structures having improved stability and new uses. Fundamentally, the invention aims to break up the complete continuity of the adhesive layer used heretofore, and to do so in a manner calculated to give improved results, and in various manners determined more particularly by materials employed and conditions to be encountered. Incidentally, the means and methods employed to accomplish the desired results have lead to new methods, products and machines which have been referred to herein.

It is an object of the present invention to employ a layer of adhesive in certain interfacially united structures so that the adhesive is not effective over certain areas of the interface, either to unite the bodies, or to prevent a free flow of moisture from body to body.

It is a particular object of the invention to unite fibrous structures interfacially with adhesive arranged at the interface to cover only a part of the interfacial area.

A further particular object of the invention is the making of ply-wood from wood veneer with an adhesive between any two adjacent plies, which adhesive is incompletely distributed over the interface.

Another object of the invention is to break up the adhesive layer into a pattern having an area with adhesive and an area without adhesive.

An important object of the invention is to break the layer of adhesive into a discontinuous layer comprising independent areas or spots of adhesive, and to provide mechanism, such as a printing or spotting roll for applying adhesive, said roll having projections which provide the coating areas.

Still another object of the invention is to provide the adhesive layer as a continuous layer with areas, like perforations therein, which may be irregular, or advantageously patterned.

Still another object of the invention is the provision of a sheet of adhesive material with perforations therein.

Various other and ancillary objects and advantages of the invention will become apparent from the description and explanation of the invention, herewith given in reference to the accompanying drawings, in which:

Fig. 7 represents a broken-down structure of ply-wood showing the arrangement of adhesive in a pattern designed for ply-wood.

Fig. 8 represents diagrammatically a mechanical method of applying liquid adhesive to wood plies and the formation of ply-wood therefrom in a heated press.

Fig. 9 shows a coating roll which may be used in the structure and process of Fig. 8, the coating roll producing a pattern like that of Fig. 6.

Figure 1:
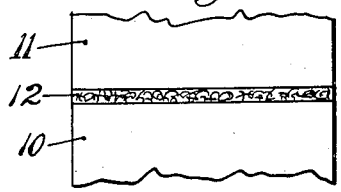
Fig. 1 represents more or less diagrammatically the two bodies adhesively united by a layer of adhesive.

Fig. 1 illustrates generally two bodies of material 10 and 11, cemented together by adhesive 12 in accordance with the present invention. Either one or both of the bodies 10 and 11 may be thin or thick, such as natural wood in the form of lumber, boards or veneer; or artificial insulating board or hard board; or felt, cloth or other fibrous substance; or regenerated cellulose or other composition; any of which can take on and give off moisture with accompanying shrinkage or expansion in one way or another.

Figure 2:
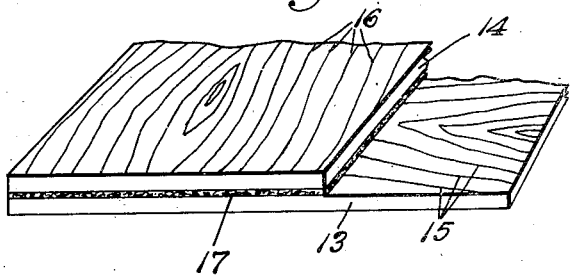
Fig. 2 represents a structure similar to Fig. 1 in which the two bodies are right-angular webs of wood veneer adhesively united to form plywood.

In Fig. 2 there is shown a two-ply-wood having the veneer layers 13 and 14 with their respective grains 15 and 16 at right angles, and their interface united by adhesive 17, in accordance with this invention.

Figure 3:
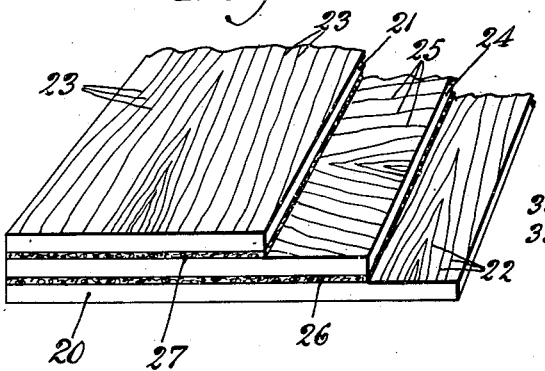
Fig. 3 represents a ply-wood structure having three plies and two layers of adhesive.

In Fig. 3 there is shown a triplex ply-wood with veneer layers 20 and 21 having their respective grains 22 and 23 parallel, a mid-ply 24 having its grain 25 at right angles to grains 22 and 23, and its faces bounded by the two layers of adhesive 26 and 27 in accordance with this invention.

Figure 4:
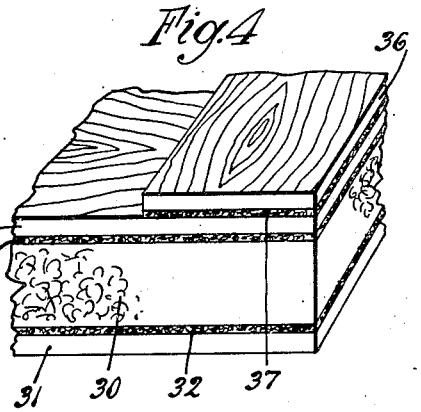
Fig. 4 represents a structural element having a veneer on one side of an artificial insulating board, and having a ply-wood sheet on the other side.

In Fig. 4 there is shown an insulating board 30, having on one side a veneer sheet 31, and adhesive 32 at the interface, in accordance with this invention. The insulating board also carries on its other face a two-ply board adhesively united to the insulating board by adhesive 33 as herein described. The two-ply board may be one like that shown in Fig. 2, and is generally referred to by its component parts, consisting of the right-angular layers of veneer 35 and 36, united by adhesive 37 in accordance with the present invention.

The adhesive layer may vary widely in form. Fundamentally, it is incomplete over the faces it cements together, in order to provide a path through the area of the layer for the transfer of moisture across the layer. The path may be in a continuous area, in which case the adhesive may be in discontinuous patches or spots. The path may be in discontinuous areas in which case the adhesive may then be in a continuous sheet-like extent. One form or the other may be preferred. Where the adhesive is supplied initially in a sheet, it is preferred to perforate the said sheet to provide the path.

The ratio of adhesive-area and moisture-path-area in a given layer may vary and is not critical where strength of the bond is not to be considered. However, where strength is a factor, the decrease in bond may weaken the strength of the ultimate product. The above mentioned ratio can be critical where the strength of bond is known and where it exceeds the strength of the material without the bond. For example, it is known that in ply-wood with a certain bond, for example phenol-formaldehyde resin, the bond has a stronger resistance to shear than the unbonded materials. Assuming that it is 40% in excess, it is therefore possible to lessen the bond substance until the remainder in use is at least equal in strength to the unbonded material. Where sheet-form adhesive is used perforations may be made to provide a moisture-path-area in accordance with calculations.

The arrangement of the moisture-path-area or areas is preferably made in a regular pattern. For standard types of ply-wood the character of the pattern is important and it is preferred to make it extend in the same way with relation to the direction of the grains in the wood or the veneers. Veneer or wood loses and acquires moisture more readily in a direction across the grain but it more easily transmits moisture within itself along the grain. Given any elongated area for the moisture-path, the area has more capacity to lose or acquire moisture when it crosses the grain at right angles. Where any area in one body must lose moisture to or acquire moisture from a similar area of an adjacent body, the areas should have as nearly as possible the same capacity. Where veneer grains are at right angles to each other, any moisture-path should extend symmetrically with respect to the 45° line between them. Any circle in a regular pattern will provide this, whether it defines a spot of adhesive, or a moisture-path. Also an elongated area on a 45° axis will do likewise. This may be appreciated by referring these statements to Fig. 7. The elongated areas shown are equally related to each of the crossing grains of layers 45 and 46. Were any one of these areas parallel to grain 47 in layer 45 for example, it would permit less loss or acquisition of moisture than can occur through said area from layer 46 where its grain 48 crosses the elongated area. This would limit the efficiency of the area as herein hypothetically located. Various forms are therefore illustrated, but it is to be understood that many other variations may be made.

Figure 5:
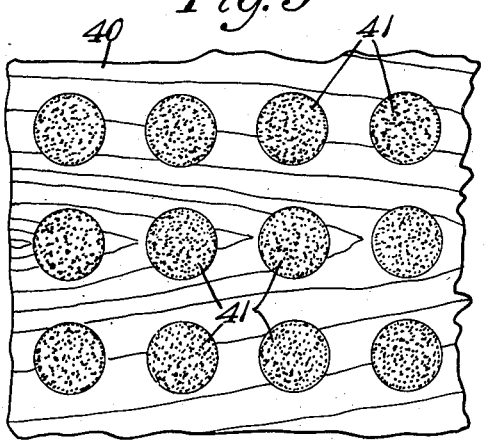
Fig. 5 represents one arrangement of adhesive on a wood-ply, the adhesive being discontinuous in the layer in the form of a spotted pattern.
Figure 6:
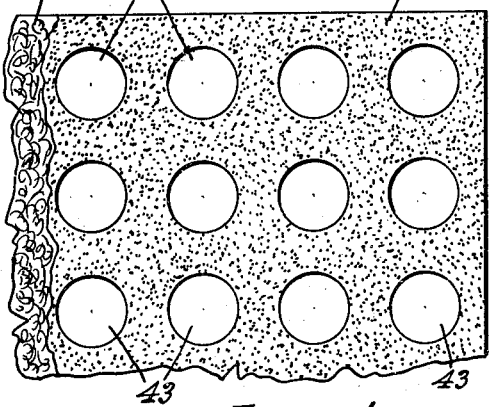
Fig. 6 represents a layer or sheet of adhesive in continuous form with a fibrous skeleton sheet, and holes formed in the layer.

In Fig. 5, the area 40 illustrates one of the bodies 10 or 11 and the circular spots 41 are adhesive. The circles 41 are preferably in an ordered pattern. In Fig. 6 the arrangement is reversed and the numeral 42 illustrates the adhesive in continuous extent with circles 43 therein having no adhesive. Fig. 6 may also represent a sheet of adhesive material, whether it be glue, phenol-formaldehyde resin, rubber or other substance, with or without reinforcing means such as fibers forming a skeleton sheet, as indicated at 44. Such a sheet may be made by filling a highly porous sheet or skeleton-like cellulose sheet 44 with the phenolic-formaldehyde material to produce reactive substance 42 in dry solid form, and then punching or cutting holes in the sheet, such as circles 43, or other forms, like the holes in the pattern shown in Fig. 7.

In Fig. 7 there are perforations in the adhesive layer which are designed and placed to be efficient as above described with reference to the 45° angle in the customary 90° two-ply grain relations in ply-wood. The perforations are further arranged so that there is no straight line through the pattern which does not cut through adhesive. The arrangement has been considered with reference to the most prevalent cuts in ply-wood, which are cuts running with and across the grain, with a view to preserving considerable adhesion at a cut edge. In Fig. 7 there are shown right-angular wood plies 45 and 46, their respective grains 47 and 48 being respectively horizontal and vertical in the drawings. The stippled area 49 represents adhesive substance with elongated, round-ended holes 50 arranged in similar patterns on 45° lines to the left and right. The stippled area may represent the appearance of a perforated sheet, with or without the fiber above mentioned, of phenolic-resin as it may be placed upon ply 45 and covered with ply 46, before subjecting the assembly to heat and pressure. It it suitable to place such an assembly in a press with one or two heated platens, at a temperature of 285° F., at a mechanical pressure of 200 lbs. per sq. inch for a period of 10 minutes. The time, pressure and temperature may vary widely as is generally known. This heats the resin and hardens it as a bond. At this point in the description, one of the advantages of the present invention will become apparent in connection with the use of heat and pressure, and particularly with resins or adhesives which are set by heat and pressure.

The adhesive substance under heat may produce some gas or vapor, and moisture in the wood or other bodies will be converted to vapor. Under the mechanical pressure and high heat, the gases tend to escape, but they are partly confined in the mass under pressure. A press cannot always be released immediately, pending dissipation of the gases, or else the board will pop or explode. This is more likely to happen as the plies increase above two, and all the more so, as the adhesive is resistant or sealing in character, such as the phenolic resin. The central plies have no outlet for gases therein, except the edges. But when the adhesive layer is broken up, as in the present invention, the central layers can lose their gases through the adhesive layer and into the layers nearer the surface, and so on, until the gases are reduced in pressure sufficiently to avoid disrupting the board.

For simplicity of manufacture, it is preferred to use the prepared perforated sheets of adhesive, or even separated strips of adhesive. Rather than perforating a sheet of adhesive, strips of adhesive may be woven into a coarse porous mesh. In such case, it is preferred to use strips which do not contain a vehicle of fiber or fiber sheet, since the crossings of the strips may produce high spots, which may lead to strains, tending to break the adhesion elsewhere in the spots where only one thickness of the sheet material has been effective. The normally dry self-contained heat-reactive adhesives are preferred, such as the reactive potentially-reacted phenol-formaldehyde or like resins.

The invention however is not limited to the said preferred embodiment. Adhesive may be printed onto the sheets in several ways, for example:

In Fig. 8 there is shown a spotting roll 60 with buttons or projections 61 arranged to spot adhesive, for example to produce a pattern as in Fig. 5. Adhesive 62 is contained in a tank 63 into which dips a pick-up or transfer roll 64 running against the spotting roll 60. Board, veneer or other article, illustrated by a web of veneer 65 passes between the spotting roll 60 and a pressure roll 66. Thus, the under-side is spotted with adhesive. By suitable means a body 67, such as a veneer ply, is brought into contact with the adhesive side and the two united by suitable means for the pressing operation. A press is indicated with upper plate 68 and heated platen 69, and lower plate 70 and heated platen 71.

By substituting for the spotting roll a coating roll, like that in Fig. 9, the pattern for adhesive may be made like that in Fig. 6. By altering the pattern on the roll, a pattern may be made like that of Fig. 7. The coating roll 75 in Fig. 9 may have depressions such as circles in the surface 76 or holes through a tubular shell 77, in order to provide the non-coating areas 78.

From the foregoing it will be appreciated that where laminated materials made as herein described are used as construction materials or the like, or in decorating, or in other uses—all such that changes in temperature and humidity can affect the product—the tendency to warp, or of the laminations to respond unequally, is greatly lessened, and the facility to reach an equilibrium condition is enhanced. These are ultimate advantages in the structures produced, but there are also advantages accruing in the manufacture, as above described, making the process a valuable improvement in the art.

I claim:

1. Ply-wood comprising in combination two interfacially related plies of wood with the grains of the woods at right angles to each other, and a layer of adhesive substance uniting said plies interfacially, said ahesive substance being arranged in said layer in a pattern to provide a patterned area without adhesive, the pattern being such that the said patterned area has substantially the same relative position to the grain of each ply, whereby the efficiency of the said area is greatest for the transmission of moisture from either ply to the other.

2. Ply-wood comprising in combination two interfacially related plies of wood with the grains of the woods at right angles to each other, and a layer of adhesive substance uniting said plies interfacially, said adhesive substance being arranged in said layer in a pattern to provide a patterned area without adhesive, the pattern running the same in the direction of the grain of each ply, whereby the efficiency of the said area is greatest for the transmission of moisture from either ply to the other.

3. Ply-wood comprising in combination two interfacially related plies of wood with the grains of the woods at right angles to each other, and a layer of adhesive substance uniting said plies interfacially, said adhesive substance being arranged in said layer in a pattern to provide a patterned area without adhesive, the pattern being such that every opening in the layer has the same angular relation to the grain of each ply, whereby the efficiency of the said area is greatest for the transmission of moisture from either ply to the other.

4. Ply-wood comprising in combination two interfacially related plies of wood with the grains of the woods at right angles to each other, and a layer of adhesive substance uniting said plies interfacially, said adhesive substance being arranged in said layer in a pattern to provide a patterned area without adhesive, the pattern being such that it provides a plurality of elongated openings extending at 45° to the grains of the two plies, whereby the efficiency of the said area is greatest for the transmission of moisture from either ply to the other.

5. The method of making ply-wood having at least three layers, which comprises assembling three plies of wood with two interfacial continuous layers of adhesive, the layer in at least one interface being a perforated sheet of heat-activated adhesive to provide areas lacking adhesive through which gas may escape from the mid-ply, and subjecting the assembly to heat and pressure, said areas serving to hasten the dissipation of pressure in the mid-ply whereby to permit earlier release of the applied pressure.

6. The method of making a laminated product having three plies two of which are of material porous to gas and subject to containing gas under pressure in a process of uniting the layers by adhesive, which comprises assembling said three plies with said two plies adjacent each other at a face of the assembly and including in the assembly between the three plies two interfacial layers of adhesive, the adhesive layer between said two plies being well provided with areas lacking adhesive, through which areas gas may pass from the inner ply to the surface ply, and uniting the assembly by heat and pressure, said areas serving to hasten the dissipation of pressure in the mid-ply whereby to permit earlier release of applied pressure with lessened danger of disruption from pressure of gas in said mid-ply.

7. Ply-wood comprising in combination two interfacially related plies of wood, and a layer of adhesive substance uniting said plies interfacially, said adhesive substance being well distributed over the interface and being arranged in said layer in a pattern to provide a patterned area without adhesive, the pattern being such that the said patterned area has substantially the same angular relation to the grain of each ply, whereby the patterned areas at the interface lacking adhesive serve with the same degree of efficiency to transmit moisture from one ply to another.

8. The method of making a laminated product having three adhesively united plies two of which are of material porous to gas and subject to containing gas under pressure in a process of uniting the layers by adhesive, which comprises assembling said three plies with said two plies adjacent each other at a face of the assembly and including in the assembly between the three plies perforated adhesive material in sheet form of a type which is activated to adhesiveness by application of heat, the perforations being such as not to be closed on such activation in the assembly whereby to provide vents for gas from the interior to the surface across the adhesive at the interfaces of the plies, and uniting the assembly by heat and pressure, said last mentioned step creating gas under pressure from material in the assembly, said vents permitting quickened dissipation of the pressure and gas from the mid-ply, whereby to permit earlier release of applied pressure with lessened danger of disruption from pressure of gas in the said mid-ply.

9. The method of making a laminated product having three adhesively united plies two of which are of material porous to gas and subject to containing gas under pressure in a process of uniting the layers by adhesive, which comprises assembling said three plies with said two plies adjacent each other at a face of the assembly and including in the assembly between the surface ply and the adjacent ply an interfacial layer of adhesive which layer is well provided with areas lacking adhesive, through which areas gas may pass from the said adjacent layer to the surface layer, and uniting the assembly by heat and pressure, said areas serving to hasten the dissipation of pressure in the said adjacent ply whereby to permit earlier release of applied pressure with lessened danger of disruption from pressure of gas in said adjacent ply.

10. The method of making a laminated product having three adhesively united plies two of which are of material porous to gas and subject to containing gas under pressure in a process of uniting the layers by adhesive, which comprises assembling said three plies with said two plies adjacent each other at a face of the assembly and including in the assembly between the surface ply and adjacent ply perforated adhesive material in sheet form of a type which is activated to adhesiveness by application of heat, the perforations being such as not to be closed on such activation in the assembly whereby to provide vents for gas from the interior to the surface across the adhesive at the interface of the surface ply and the adjacent ply, and uniting the assembly by heat and pressure, said last mentioned step creating gas under pressure in said adjacent ply, said vents permitting quickened dissipation of the pressure and gas from the said adjacent ply, whereby to permit earlier release of applied pressure with lessened danger of disruption from pressure of gas in the said adjacent ply.

HENRY H. PAYZANT.